Figure 1:
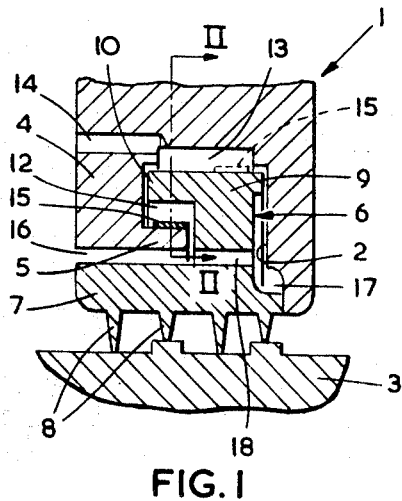

United States Patent

[11] 3,594,010

| [72] | Inventor | Laurence Hugo Frederick Warth<br>Rugby, England |
|---|---|---|
| [21] | Appl. No. | 843,447 |
| [22] | Filed | July 22, 1969 |
| [45] | Patented | July 20, 1971 |
| [73] | Assignee | The English Electric Company Limited<br>London, England |
| [32] | Priority | July 19, 1968 |
| [33] | | Great Britain |
| [31] | | 34535/68 |

[54] SHAFT SEAL FOR TURBINES
2 Claims, 2 Drawing Figs.

[52] U.S. Cl............................................................ 277/53,
  277/149, 415/170, 277/158, 277/71
[51] Int. Cl. ............................................................ F02f 11/00,
  F16j 15/48
[50] Field of Search............................................ 277/53, 55,
  56, 32, 149, 148, 71, 157, 158; 415/170, 173

[56] References Cited
UNITED STATES PATENTS
1,689,874  10/1928  Jabs.............................. 277/148

1,855,890  4/1932  Phillips........................ 277/148
2,686,657  8/1954  Kalitinsky.................... 277/71 X
FOREIGN PATENTS
1,020,900  2/1966  Great Britain................ 415/170

Primary Examiner—Samuel Rothberg
Attorney—Misegades & Douglas

ABSTRACT: A spring-loaded shaft seal for a steam turbine has a spring 15 which normally urges segments 7 lof the seal away from the rotor shaft 3. Thus a relatively large clearance is provided when the turbine is running up to speed and is on very light loads. An annular space 13 is provided around the segments 7 which is in communication with the higher pressure side of the seal via an opening 14. Thus the clearance between the seal and the rotor shaft 3 is substantially reduced when the turbine is loaded up due to a significant increase in the pressure difference across the seal. For testing, the springs 15 are set as shown dotted in FIG. 2 to urge their segments 7 towards the rotor shaft 3 so that the normal on-load running clearance may be measured and any high spots on the segment glands may be removed. The springs 15 are reset to their normal position after testing is completed.

PATENTED JUL 20 1971

3,594,010

SHAFT SEAL FOR TURBINES

This invention relates to turbines, and has particular application to steam turbines.

It is common practice to use spring-load shaft seals in steam turbines at positions where the rotor shaft extends through the walls of the cylinder(s) and through the diaphragms which form part of the stator assembly within the cylinder(s) and which separate the stages of said cylinder(s). These shaft seals are normally in the form of a ring comprising a plurality of segments which is carried by the walls of the cylinder(s) and the diaphragms. The ring segments are provided with glands and each segment is urged by its spring means towards the rotor shaft and against a stop such that the free edges of the glands are supported closely adjacent the rotor shaft. However, with such an arrangement damage may still occur to the shaft as a result of it coming into rubbing contact with the glands, particularly during runup of the turbine and when the turbine is put on turning gear after shut down due, for example, to casing distortion.

An object of this invention is to provide an alternative form of shaft seal for a turbine which at least reduces the possibility of damage to the rotor shaft.

According to the invention a turbine includes a rotor and a stator which define between them an annular clearance passage, wherein said passage is provided with a sealing arrangement which includes; an annular groove formed in the stator and opening radially into said passage; a sealing ring comprising a plurality of segments, each segment being located axially with respect to the stator by said groove, whilst being permitted limited radial movement relative thereto; means for admitting turbine working fluid from the upstream side of said passage to an annular space defined in said groove between the walls thereof and said segments, whereby in operation to enable working fluid pressure to urge said segments radially toward said rotor; and spring means having two modes of operation; the first mode employing said spring means for urging said segments radially toward said rotor on first assembly of said turbine whereby to enable clearances to be measured in their normal turbine-on-load position and to remove high spots on the segments during testing of the turbine; and the second mode employing said spring means for urging said segments radially away from said rotor in opposition to any working fluid pressure in said annular space, such that when the turbine is not running at or near full load a maximum radial clearance is provided, but such that during loading up of the turbine said clearance is progressively reduced.

The spring means may comprise a plurality of leaf springs, each for use in a respective first location to provide said first mode and a respective second location to provide said second mode.

Preferably each first location is a respective portion of said annular space, and each second location is defined between a portion of a radially inwardly facing surface provided by a respective segment and a portion of a cooperating, radially outwardly facing surface provided by a projection from a sidewall of said groove.

Figure 2:
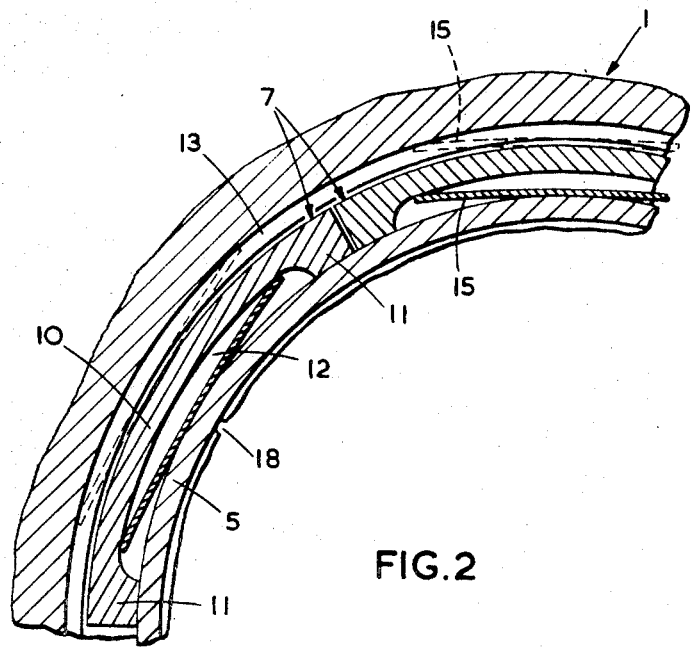

In order that the invention may be readily understood, one embodiment thereof will now be described with reference to the accompanying drawing, in which:

FIG. 1 is a fragmentary sectional elevation of part of a diaphragm separating two stages of a turbine cylinder showing the sealing ring; and FIG. 2 is a fragmentary view on the line II–II of FIG. 1.

Referring to the drawings, the diaphragm 1 is provided with an annular groove 2 which opens towards the rotor shaft 3. One wall 4 of the groove is cut back from the rotor shaft and is provided with a circumferential projection 5 which extends into the groove 2. The sealing ring 6 is adapted to be slidably mounted in the groove and is divided into a number of segments 7 each having a number of radially extending glands 8 which, in the assembled position of the sealing ring, extend towards the periphery of the rotor shaft 3. Each segment 7 is provided with a shank portion 9 of inverted L-shaped cross section which is a sliding fit within the annular groove 2, the limb 10 of the segment 7 overlapping the projection 5 of the groove wall 4. The ends of the limb 10 are provided with projections 11 (see FIG. 2) which extend radially inward towards the projection 5. Thus, in its assembled position the segment provides a space 12 between the projection 5 and limb 10 and an annular space 13 is provided between the floor of the groove 2 and the shank portion 9. A vent opening 14 communicates with that side of the diaphragm which is normally at the higher pressure during turbine operation. The main body part carrying the glands 8 of each segment 7 provides a further annular space 16 on the higher pressure side of the segment and this space is in communication with another annular space 17 on the other side of the segment via a duct 18. Such an arrangement provides equal pressures on either side of each segment 7 and thus eliminates or at least minimizes any side thrust on said segments.

When initially assembled the springs 15 are positioned as shown dotted in the spaces 13 and act to urge their respective segments 7 towards the rotor shafts 3, this inward movement being limited by the projections 11 engaging the projection 5 of the groove wall 4. This enables the normal on-load running clearance between the segment glands 8 and the rotor shaft 3 to be measured and any high spots on said glands to be removed during initial test running. When testing is complete the turbine is dismantled for dispatch to site and when it is reassembled on site the springs 15 are positioned in the spaces 12 and thus act to urge their respective segments away from the rotor shaft 3. Thus, in their normal position, the springs 15 maintain the segments 7 at positions giving a maximum clearance between the segment glands 8 and the rotor shaft 3 when the turbine is not in operation since no pressure difference exists between the two stages separated by the diaphragm. Also during runup of the turbine, although there will be a progressive increase in the pressure difference, this difference would still not be sufficient to move the segments 7 against the action of their springs 15. However, during loading-up of the turbine as this pressure difference further increase, and reaches a level sufficient to act on the segments 7 against the action of the spring 15, the clearance is reduced until a minimum clearance is obtained when the turbine reaches its normal operating loads.

In addition, it will be appreciated that a maximum clearance will be maintained when the turbine is on turning gear since again there would be no pressure difference between said two stages.

The embodiment described above is suitable for application wherever there is a sufficient pressure difference between adjacent stages to a steam turbine. Thus where a steam turbine has multistage HP, IP, and LP cylinders, the embodiment may be employed on all but the outermost HP and IP stages and, subject to the same proviso, to some of the LP stages.

I claim:

1. For a turbine, a seal for sealing an annular clearance passage defined between a rotor and a stator, including:
    the stator having defined therein a circumferentially extending groove opening radially into the clearance passage;
    a sealing ring comprising a plurality of segments disposed in the groove and located axially thereby while being permitted limited radial movement;
    the segments defining with the walls of the groove a first annular space;
    duct means communicating between the upstream side of the seal and the first annular space for allowing, in normal operation of the turbine, turbine working fluid to urge the segments radially towards the rotor;
    a radially inwardly facing surface provided on each segment and a cooperating radially outwardly facing surface provided by the stator defining between them a second annular space; and spring means disposable for normal operation of the turbine in the said second annular space to resiliently urge the segments radially away from the rotor in opposition to the turbine working fluid, said spring means being transferable to the said first annular space to resiliently urge the segments radially towards the rotor in absence of turbine working fluid so that both running-in and clearance testing of the seal may be performed.

2. A seal according to claim 1, wherein the spring means comprises a plurality of leaf springs, the said radially outwardly facing surface is provided on a spigot projecting axially from a wall of the groove, and the said radially inwardly facing surface is provided on an axially extending arcuate portion formed on each segment.